Jan. 21, 1930.  L. SCHMIDT  1,744,083
GARDENIA COLLAR
Filed May 1, 1929
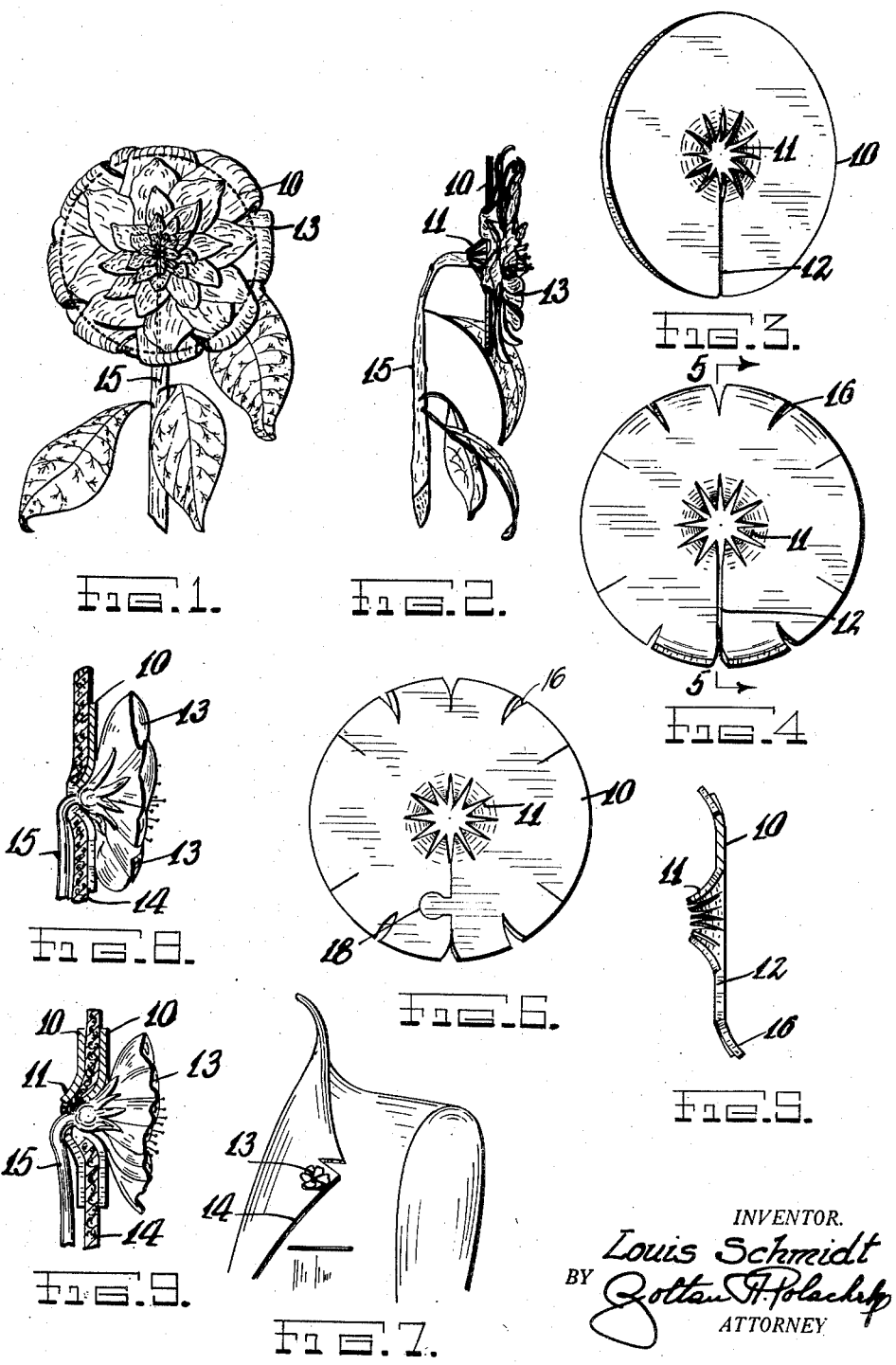

UNITED STATES PATENT OFFICE

LOUIS SCHMIDT, OF NEW YORK, N. Y.

GARDENIA COLLAR

Application filed May 1, 1929. Serial No. 359,511.

This invention relates to a flower collar adapted to be worn with a gardenia or buttonhole flower on a coat lapel, or in other similar manner. Its object is to provide a protective element between the flower and the clothing to which it is attached.

Another object is to support the petals of the flower and to keep it in shapely form and neat and attractive in appearance.

A further object is a means to grip the stem and to hold the shield in close contact with the flower.

Another feature is a means to permit of slipping the collar over the stem at a point close to the flower without the necessity of drawing it over the entire length thereof.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 illustrates a flower with the collar indicated behind it in dotted lines.

Fig. 2 shows a side view of the flower illustrated in Fig. 1.

Fig. 3 is an enlarged perspective view of the collar in its simplest form.

Fig. 4 is another form of the collar having means for shaping its marginal contours.

Fig. 5 is a section on the line 5—5 of Fig. 4.

Fig. 6 illustrates a means for interlocking the edges of the slit portion of the collar.

Fig. 7 shows a fragmentary view of a gentleman's coat with a flower on the lapel thereof.

Fig. 8 illustrates in a fragmentary view, a flower with the collar thereon in section and adjacent to a section of a coat lapel.

Fig. 9 shows a view similar to that seen in Fig. 8, but with two collars seen in section, one on the outer face of the lapel and one behind the same.

The collar is shown in a perspective view in Fig. 3 and is constructed as follows. A disk 10 which may be of card board, metal, stiffened cloth, or any suitable material, is perforated in the central portion and slit at intervals radiating from the said perforation thus producing the points 11. A slit 12 extends from the central perforation to the outer margin of the collar. The points may be forced backward to conform to the shape of the flower and to engage and grip the stem thereof thus holding it securely in position. This may be seen in Fig. 2.

To place the collar about the stem, the disk is spread open at the slit 12 and slipped directly into place.

The appearance of the flower when attached is as seen in Fig. 7 at 13 on the coat lapel 14. The disk is not seen, it being covered by the petals of the flower.

When a single collar is worn, it is attached as seen in Fig. 8. It will be observed that the flower does not come in contact with the cloth of the lapel. No moisture or stain may be transmitted thereto. In addition to this, a stiff, unyielding surface is maintained behind the flower and it is held upright and made to appear at the best advantage.

In Fig. 9 two collars are shown, the additional one being pushed up against the lapel at the back. This serves to give further holding security, the points 11 having a tendency to close down upon and grip the stem 15 of the flower.

The form of shield shown in Figs. 4 and 5 has marginal slits 16 which may be bent into such contours as may be desired to lift the petals up, or to permit them to fall open.

The collar shown in Fig. 6 has an interlocking tab 18 which extends outward from one edge and fits into a receiving cut-out in the face adjacent thereto. This prevents any spreading of the face elements when in position about the stem of a flower.

While I have shown and described the preferred embodiment of my invention, it is to be understood that I do not limit myself to the precise construction herein disclosed and the right is reserved to all changes and modifications coming within the scope of the invention as defined in the appended claims.

Having thus described the invention, what is claimed as new and desired to be secured by Letters Patent is as follows:—

1. In an article of the class described, a centrally perforated disk element, inwardly disposed point members ranged about the said perforation and adapted to be forced backward from the plane of the disk, and a slit extending from the said perforation through to the outer margin of the said disk.

2. In an article of the class described, a centrally perforated disk element, inwardly disposed point members ranged about the said perforation, a slit extending from the said perforation through to the outer margin of the said disk element, and marginal slits about the edges of the said disk element.

3. In an article of the class described, a centrally perforated disk, inwardly pointing tooth members about the said perforation, a slit extending from the said perforation through to the outer margin of the said disk, and means to interlock the opposed edges of the said slit.

In testimony whereof I have affixed my signature.

LOUIS SCHMIDT.